Nov. 14, 1967    E. E. FREELAND    3,352,173
VARIABLE TRANSMISSION GEAR SHIFT FOR BICYCLES
Filed Sept. 23, 1965    2 Sheets-Sheet 1
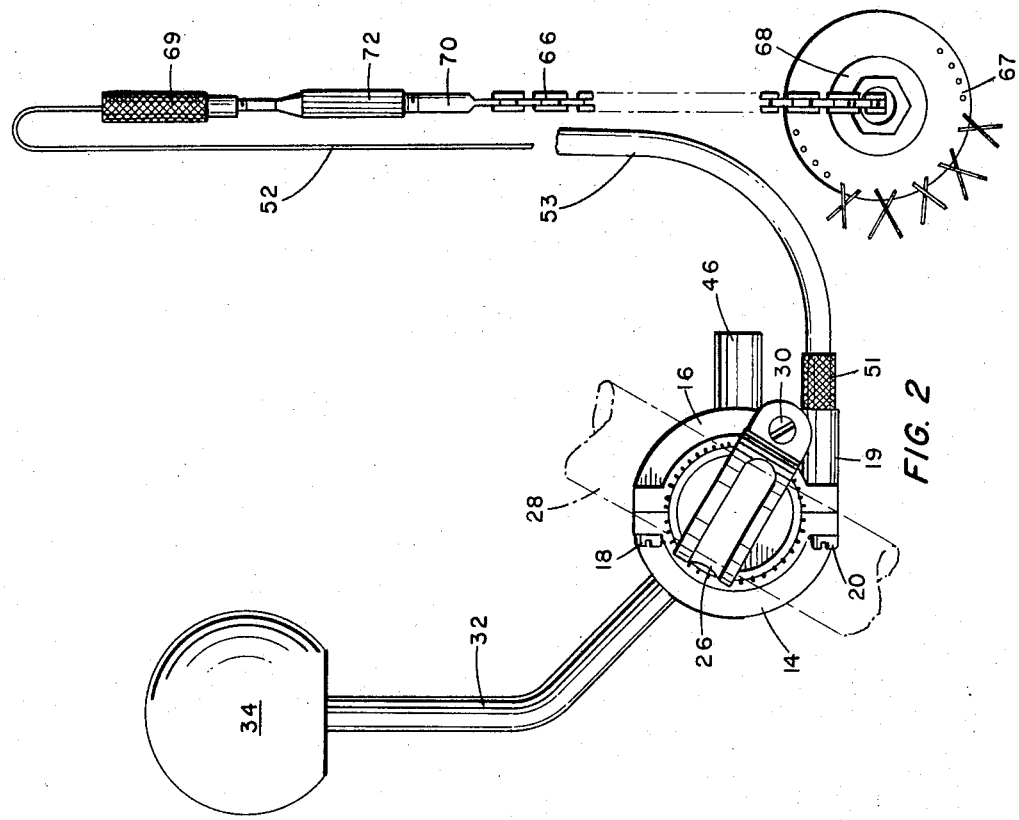
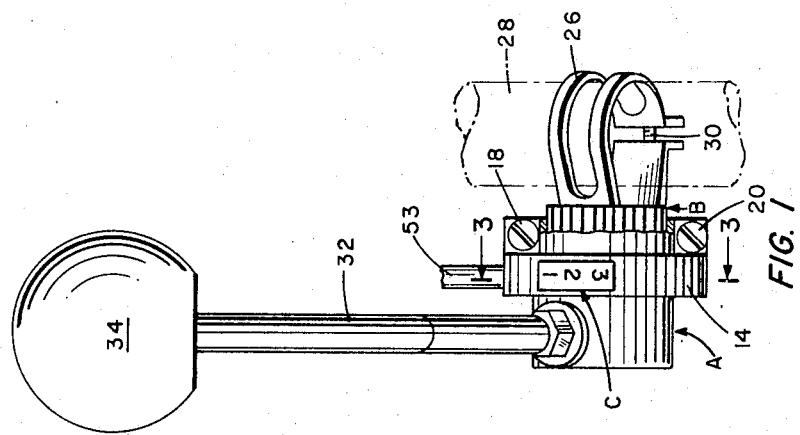
INVENTOR
ELMER E. FREELAND
BY
ATTORNEY

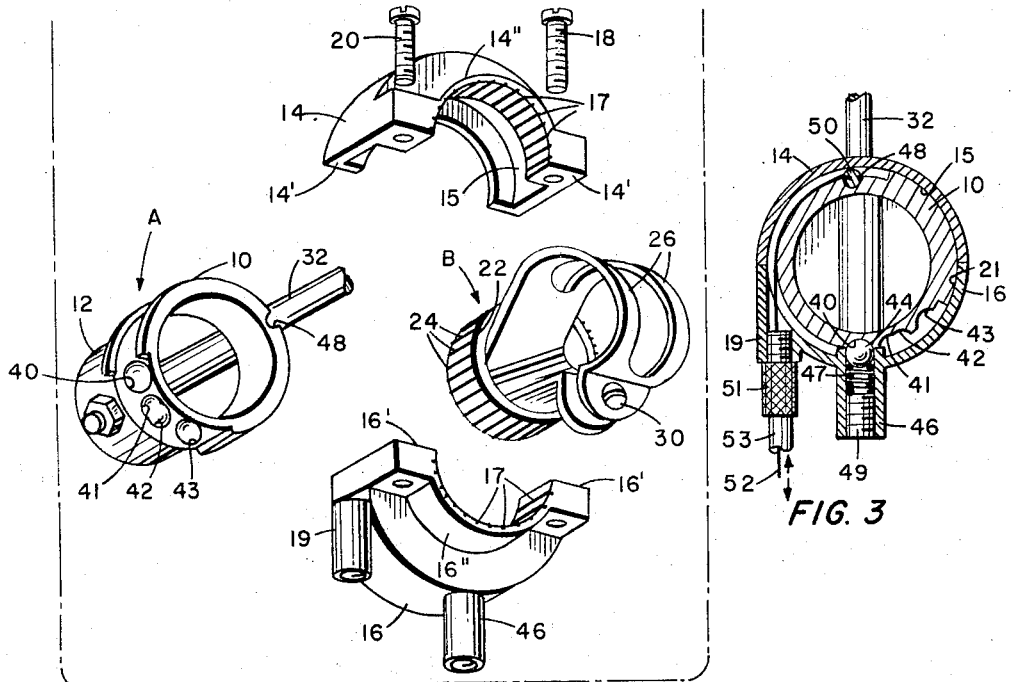
FIG. 4
FIG. 3
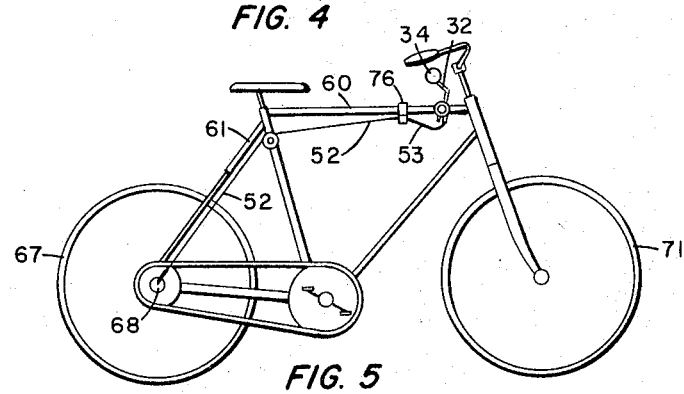
FIG. 5
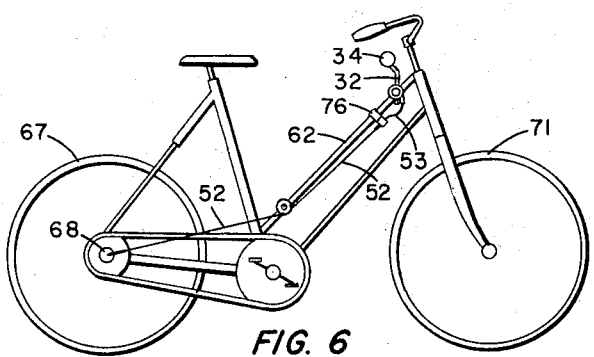
FIG. 6
INVENTOR
*ELMER E. FREELAND*
BY
ATTORNEY United States Patent Office 3,352,173
Patented Nov. 14, 1967

3,352,173
VARIABLE TRANSMISSION GEAR SHIFT
FOR BICYCLES
Elmer E. Freeland, 4500 Belle Grove Road,
Baltimore, Md. 21225
Filed Sept. 23, 1965, Ser. No. 489,592
2 Claims. (Cl. 74—473)

ABSTRACT OF THE DISCLOSURE

A pivotable hand lever for operating a multiple speed gear mechanism for a bicycle having a clamp for fastening to a bicycle frame and an angularly adjustable connection between the clamp and the mount for the pivotable hand lever affording initial angular adjustment and subsequent fastening of the lever in proper position with respect to the frame.

---

The present invention relates to a gear shifting mechanism for a bicycle multiple gear transmission.

In the present variable speed gear shifting devices, the shifting is done by a finger lever in the vicinity of the handle-bar grip. These finger controls operate quite stubbornly after a time because of corrosion of the moving parts. Also a considerable amount of friction will set up in the cable extending over the handle-bar to the rear wheel after a short time in use, particularly after the cable has been exposed to the weather, which neutralizes the lubrication in the cable.

The present finger operated levers have a substantially short leverage which also makes the shifting of the gears rather difficult when the above named circumstances are present.

One of the primary objects of the invention is to provide a gear shifting mechanism that is positive in its operation.

Another object of the invention is to provide a bicycle gear shift with a variety of adjustable mounting.

A further object of the invention is to provide means that will reduce the length of the gear shift operation cable.

A still further object of the invention is to provide a gear shifting mechanism that will accommodate all the known makes of bicycles having variable shift transmissions.

While several objects of the invention have been set forth other objects, uses and advantages will be more apparent as the nature of the invention is more fully disclosed including its novel construction, combination and arrangement of its various parts as shown in the accompanying drawings and detailed description to follow.

In the drawings:

FIGURE 1 is a rear elevational view of the gear shifting assembly.

FIGURE 2 is a side elevational view of the same.

FIGURE 3 is a fragmentary sectional view taken on the line 3—3 of FIGURE 1.

FIGURE 4 is an exploded perspective view of each of the several parts of the assembly.

FIGURE 5 is a view in elevation of a bicycle showing the gear shifting assembly mounted to a male type bicycle having an upper cross bar.

FIGURE 6 is a view in elevation similar to that shown in FIGURE 5 showing the gear shift assembly mounted to a bicycle V frame of a type generally known as a female bicycle.

In referring to the drawings like reference characters are used to designate like and similar parts throughout the several views.

Referring in particular to FIGURES 3 and 4 the gear shift assembly comprises primarily of an inner cylindrical member A, which is preferably hollow, but not necessarily so. This inner member has a portion 10 of a predetermined diameter and a portion 12 etxending to one side of the portion 10 and preferably of a lesser diameter. However, this portion 12 is not limited to being of a lesser diameter than the portion 10, but it is so constructed in the present illustrations for convenience.

Referring in particular to FIGURES 3 and 4 there is provided a split housing having parts 14 and 16 adapted to be clamped in position by the thread screws 18 and 20. The housing elements 14 and 16 are such dimensions that the portion 10 of the inner member is rotatably retained within the groove 15 when the surface 14′ and 16′ are tightly united. The housing or clamping elements are formed with an extension 14″ to one side of the groove 15 having a plurality of splines or serration 17 on its inner surface and is adapted to grip a securing element B. This securing element B is provided with a cylindrical portion 22 having on its outer surface splines or serrations 24 adapted to engage the serrations or splines 17 on the inner surface of the housing elements 14 and 16 when the housing elements are tightly drawn together. With this arrangement, the inner member A may be rotatable relative to the housing elements 14 and 16. Fixedly secured to the portion 22 of the supporting element B is a clamp 26. The clamp is for the purpose of securing the assembly to a frame 28 of a bicycle, as best shown in FIGURES 1 and 2. The clamp 26 is adjusted and secured to the bicycle frame by the screw 30.

Referring again to the inner member A, the portion 12 has secured thereto an elongated lever or arm 32, which extends for a substantial distance from one side thereof and is provided with a knob 34. The shifting operation is most satisfactory when the lever 32 is not too short. The length of the lever is preferably not less in length from the outer surface of the inner rotatable member than three times the radius of the rotatable inner member A, which operates the shift mechanism by rotating the inner member for a predetermined distance. Extending about a portion of the outer surface of the portion 10 of the inner member A is a plurality of recesses corresponding to the number of gears in the variable transmission. These recesses may be of any suitable form. In the present illustration they are spherical and are shown by numbers 40, 41, 42 and 43. They are spaced at intervals to correspond to the distance it is desired to provide for the proper operation of the transmission gears. It will be noted that the recess 41 and 42 are only a slight distance apart. This is to accommodate a particular type of transmission.

The housing element is provided with a follower in the form of a rigid ball 44, slidably receivable within an internally threaded tubular portion 46. The ball 44 is held resiliently inwardly toward the inner member 10 and in the path of the recess 40 to 43 by a compression spring 47 engaging the outer portion of the ball, the outer end of the spring being held by an adjustable screw 49 for regulating the pressure on the ball, which is necessary to take up wear, etc. of the several parts. The ball is adapted to engaging these recesses 40 to 43 when the member 10 is rotated by the handle 32. Also positioned on the surface of the portion 10 and at a predetermined point is a recess 48 for receiving a lug 50 connected to a cable 52 carried in a housing 53, the cable being guided by a member 51 fixed to a portion 19 formed tangent to the surface of the portion 10 of the inner member A. It is seen that by rotating the inner member A the cable 52 will move in the direction of the arrows shown in FIGURE 3. This cable extends rearwardly along the frame elements 60 and 61 of a two wheeled bicycle 67 and 71, see FIGURE 5, and along the frame element 62, as shown in FIGURE 6, to the rear wheel 67 where it is connected to a flexible element 66 leading to the interior of the hub 68 and is connected to the variable transmission.

The end of the cable 52 extending toward the rear wheel 67 is provided with an attaching element 69, which may be attached directly to the element 70 (if of the proper size) carried by the member 66 or to an adapter 72. This adapter 72 will provide for attaching the present gear shifting assembly to all presently known bicycles having variable speed transmissions.

Referring to FIGURE 1 it will be noted that the corresponding number of gears carried by the variable transmissions are marked on the outer housing as indicated by the letter C, which also correspond to recesses 40 to 43 carried by the inner member A.

With this type of gear shift the operating cable 52 is much shorter than the conventional type and is fixed to the frame as shown by an attaching means 76. This gives a more positive movement and reduces the amount of cable which reduces friction. The cable also extends in a more direct line from the shifting assembly to the hub of the bicycle, as shown in FIGURES 5 and 6.

While the invention is shown and described in a particular form it is not intended as a limitation as the invention is best described in the appended claims.

I claim:

1. A mounting assembly for the operating lever of a bicycle gear shifting mechanism comprising:
    a securing means for fastening the assembly to a bicycle frame,
    a cylindrical member fixed to said securing means, a two part housing having an inner cylindrical portion fitting and adapted to be rotatably adjustable on said cylindrical member and to be subsequently tightly clamped in adjusted position thereon, means to hold the two part housing together and to clamp the same on cylindrical member, the two part housing having an internal groove therein, an inner member rotatably mounted in said groove and having a portion extending outwardly of said two part housing,
    a hand lever extending from said outwardly extending portion of said inner member for rotating the latter in said two part housing, and
    means for attaching an operating cable to said inner member for reciprocating the same upon rotation of side inner member.

2. The structure defined in claim 1 in which the cylindrical member and the inner cylindrical portion of the two part housing are each provided with cooperating serrations.

References Cited

UNITED STATES PATENTS

| | | | |
|---|---|---|---|
| 674,745 | 5/1901 | Sponsel | 74—488 X |
| 698,132 | 4/1902 | Palmer | 74—781 |
| 865,805 | 9/1907 | Sangster | 74—489 |

FOREIGN PATENTS

| | | |
|---|---|---|
| 530,062 | 12/1940 | Great Britain. |
| 750,478 | 6/1956 | Great Britain. |

FRED C. MATTERN, JR., *Primary Examiner.*

C. F. GREEN, *Assistant Examiner.*